United States Patent [19]

Mackey et al.

[11] 3,896,411

[45] July 22, 1975

[54] REVERBERATION CONDITION ADAPTIVE SONAR RECEIVING SYSTEM AND METHOD

[75] Inventors: Larry C. Mackey, Greensburg, Pa.; Dennis C. Kozlowski, Lutherville, Md.

[73] Assignee: Westinghouse Electric Corporation, Pittsburgh, Pa.

[22] Filed: Feb. 19, 1974

[21] Appl. No.: 443,874

[52] U.S. Cl. .................................................. 340/3 R

[51] Int. Cl. ........................... G01s 9/66; G01s 7/66

[58] Field of Search .......... 340/3 R, 3 D; 343/5 AG, 343/7 A

[56] References Cited

UNITED STATES PATENTS 2,566,858 9/1951 Sebring .............................. 340/3 R

OTHER PUBLICATIONS

Cooke, *The Radio and Electronic Engineer*, June, 1967, pp. 353–360.

*Primary Examiner*—Richard A. Farley

*Attorney, Agent, or Firm*—D. Schron

[57] ABSTRACT

The disclosure relates to a sonar receiver gain control technique in which the envelope of return acoustic energy is detected and employed to control the gain of a sonar receiver both in accordance with current reverberation and expected reverberation conditions. A target threshold level adaptable to prevailing reverberation conditions is also disclosed. Specifically, the ideal sonar receiver response is more nearly approximated by controlling the gain of a voltage controlled variable gain amplifier of a sonar receiving circuit in a time varying manner based at least partially upon the expected average rate of fall off of reverberation as a function of time. In one embodiment of the invention, the gain of an automatic gain control (AGC) loop is sufficiently high to normalize reverberation during an initial portion of the period between successive transmitted pulses or pings, e.g., during the period in which the reverberation level is changing most rapidly, and the AGC loop gain is thereafter decreased considerably so that the AGC loop time constant is long compared to the pulse width of an expected target ehco. Since the AGC loop time constant is extremely long (e.g., greater than three times the target echo duration) during this latter portion of the ping period, the loop is so slow that it cannot normalize the expected reverberation fall off. Thus, in addition to providing a fast AGC loop time constant initially as was previously mentioned, a loop control voltage based upon the expected rate of fall off of the reverberation is utilized to augment the AGC loop during the latter portion of the interpulse period. In accordance with another aspect of the invention, a target threshold level applied to a comparator or target detector is adapted to prevailing reverberation conditions. The adaptive threshold permits automatic variations of the target threshold level as a function of reverberation conditions so that target detectability is not sacrificed because of a need to meet worst case reverberation conditions.

11 Claims, 8 Drawing Figures

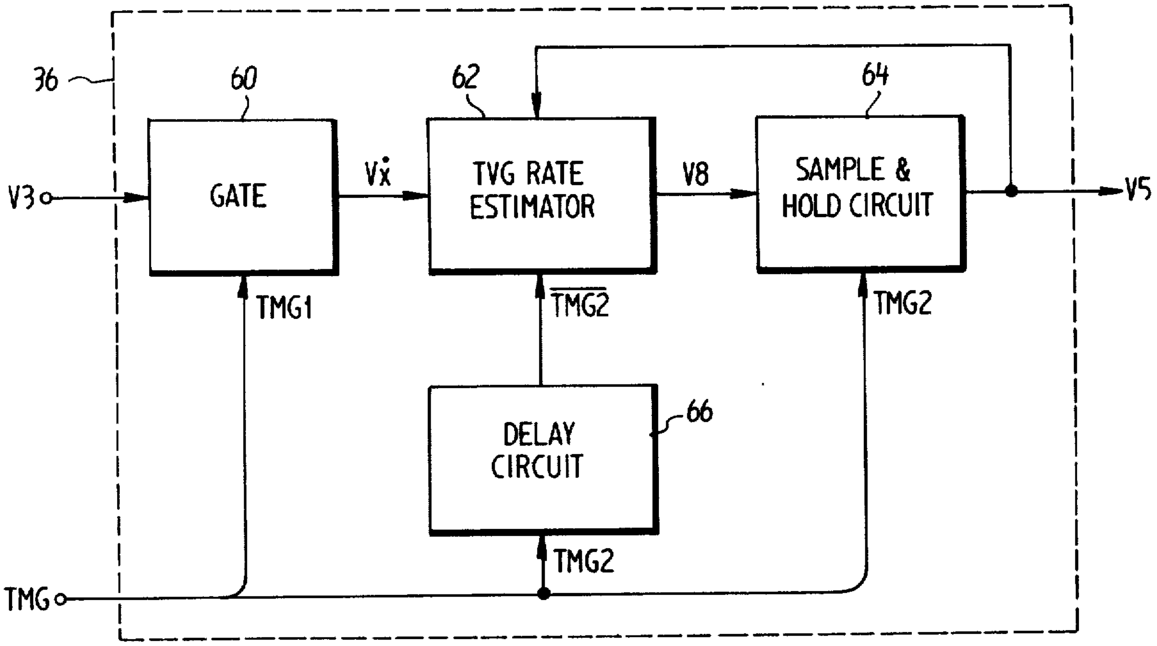
FIG. 4 TIME VARIABLE GAIN COMPENSATOR
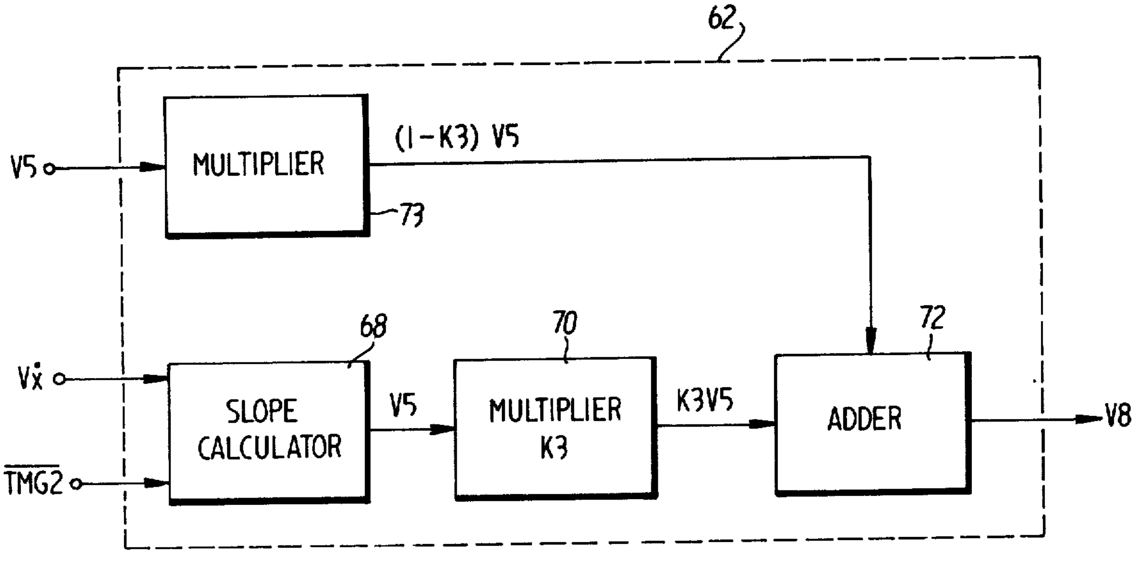
FIG. 5 TVG RATE ESTIMATOR

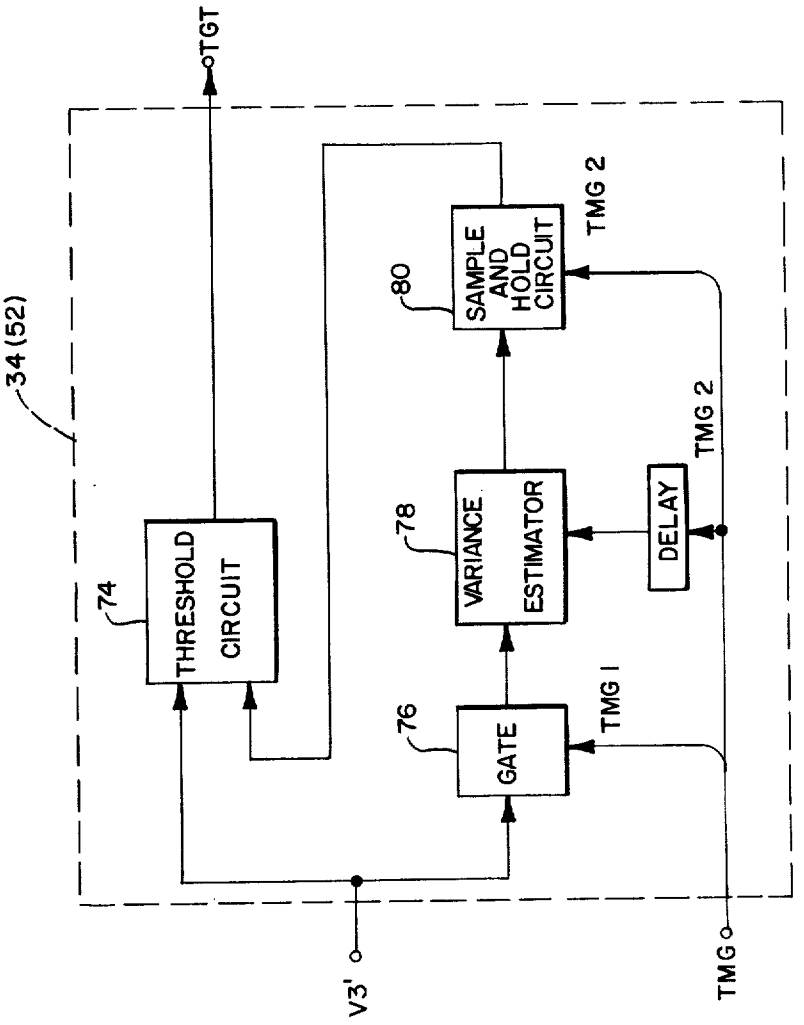
FIG. 6 ADAPTIVE THRESHOLD TARGET DETECTOR

REVERBERATION CONDITION ADAPTIVE SONAR RECEIVING SYSTEM AND METHOD

BACKGROUND OF THE INVENTION

1. Field of the Invention

The present invention relates to sonar receiving systems and, more particularly, to a method and system for controlling the gain and target detection threshold of a sonar receiving system in accordance with prevailing reverberation conditions.

2. State of the Prior Art

One of the more severe limitations to detection of underwater targets is the unpredictable nature of the reverberation background. For example, on a time and a location basis, reverberation may vary considerably with such factors as fluctuations in water temperature, water depth and location within a body of water.

Because of the variations in reverberation, the detected envelope of the reverberation may fluctuate considerably about its mean level and known systems cannot both minimize these fluctuations and maximize target detectability. For example, in typical existing torpedoes of the type employing active acoustic homing systems, the typical approach to target detection has been to normalize the mean value of the reverberation so that a constant threshold level may be utilized. These systems do not, however, adapt the threshold level to the fluctuations about the mean level of the reverberation. Hence, existing systems are typically adjusted to provide the best performance under worst case reverberation conditions resulting in an unnecessarily large sacrifice in detection under less erratic conditions.

Moreover, the detection of the zero doppler targets by active acoustic homing torpedoes and other systems employing acoustic receivers is particularly difficult because of the impossibility of discriminating between a target and reverberation on the basis of frequency information. In fact, known systems require approximately 30 dB signal-to-noise ratio for detection of zero doppler targets. This may result in short detection ranges for detection of zero doppler targets.

OBJECTS AND SUMMARY OF THE INVENTION

It is accordingly an object of the present invention to provide a novel method and system for minimizing the affects of undesired reverberation in a acoustic receiving system.

It is another object of the present invention to provide a novel method and sonar receiving system in which receiver gain is controlled at least partially in response to prevailing reverberation conditions so that the affect of reverberation on target detectability is minimized.

It is yet another object of the present invention to provide a novel method and sonar target detecting system in which a target detection threshold is adapted to prevailing reverberation conditions.

These and other objects and advantages of the present invention are accomplished in accordance with a preferred embodiment of the invention through the provision of a receiver gain control technique in which the envelope or return acoustic energy is detected and employed to control the gain of a sonar receiver both in accordance with current reverberation and expected reverberation conditions. A target threshold level may be adapted to prevailing reverberation conditions in accordance with another aspect of the invention.

More specifically, the ideal system response is more nearly approximated by controlling the gain of a voltage controlled variable gain amplifier of a sonar receiving circuit in a time varying manner based at least partially upon the expected average rate of fall off of reverberation as a function of time. In one embodiment of the invention, the gain of an automatic gain control (AGC) loop is sufficiently high to normalize reverberation during an initial portion of the period between successive transmitted pulses or pings, e.g., during the period in which the reverberation level is changing most rapidly, and the AGC loop gain is thereafter decreased considerably so that the AGC loop time constant is long compared to the pulse width of an expected target echo. Since the AGC loop time constant is extremely long (e.g., greater than three times the target echo duration) during this latter portion of the ping period, the loop is so slow that it cannot normalize the expected reverberation fall off. Thus, in addition to providing a fast AGC loop time constant initially as was previously mentioned, a loop control voltage based upon the expected rate of fall off of the reverberation is utilized to augment the AGC loop during the latter portion of the interpulse period.

In accordance with another aspect of the invention, a target threshold level applied to a comparator or target detector is adapted to prevailing reverberation conditions. The adaptive threshold permits automatic variations of the target threshold level as a function of reverberation conditions so that target detectability is not sacrificed because of a need to meet worst case reverberation conditions.

BRIEF DESCRIPTION OF THE DRAWINGS

FIG. 4 is a functional block diagram illustrating one embodiment of the time variable gain compensator of FIG. 3 in greater detail;

FIG. 5 is a functional block diagram illustrating one embodiment of the TVG rate estimator of FIG. 4 in greater detail; and, FIG. 6 is a functional block diagram illustrating one embodiment of the adaptive threshold target detector of FIG. 3 in greater detail.

DETAILED DESCRIPTION

Figure 1:
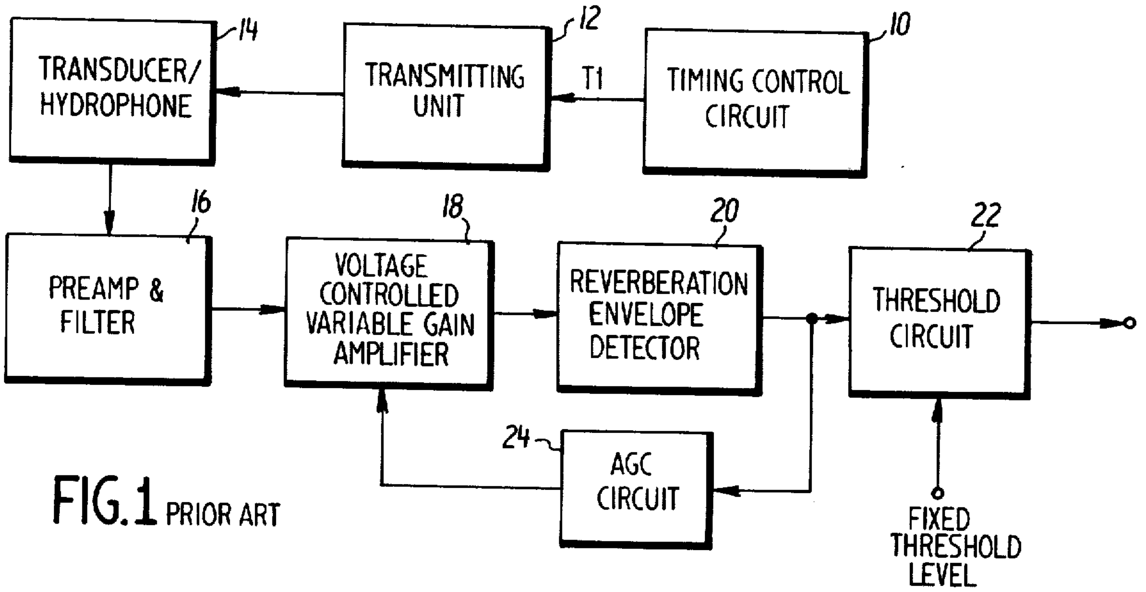
FIG.1 PRIOR ART
FIG. 1 is a functional block diagram of a known sonar or acoustic receiving circuit.

FIG. 1 illustrates a typical prior art active acoustic system of the type which might be utilized in an active acoustic homing torpedo. In such a system a timing control circuit 10 may periodically trigger a transmitting unit 12 to effect the transmission of a pulse of sound wave energy, i.e., a ping, through the use of a suitable conventional transducer/hydrophone unit 14.

Reflected sound or reverberation is detected by the transducer/hydrophone unit 14 and converted to an electrical signal. This electrical output signal from the transducer/hydrophone unit 14 may be amplified and filtered by a suitable preamplifier and filter 16 and applied to a conventional voltage controlled variable gain amplifier 18 for further amplification. The output signal from the voltage controlled variable gain amplifier 18 may be applied to a conventional envelope detector 20 for detection of the envelope of the reverberation and target signals (i.e., all return energy) and the detected envelope signal may be applied to a conventional threshold circuit 22 for detection of targets.

The output signal from the envelope detector 20 is also usually applied to an automatic gain control (AGC) circuit 24. The output signal from the automatic gain control circuit 24 varies in response to the detected envelope and attempts to control the gain of the variable gain amplifier 18 in such a way that the envelope signal remains substantially constant in amplitude except when target echoes are received. To accomplish this result, the AGC circuit is typically provided with a time constant having a value designed to normalize the mean value of the reverberation envelope so that the threshold circuit 22 may employ a constant threshold level.

However, the reverberation envelope may fluctuate considerably about the mean level and known systems cannot both minimize these fluctuations and maximize target detectability. As a result, existing systems are typically adjusted to provide suitable performance under worst case reverberation fluctation conditions and target detectability under less erratic reverberation conditions is sacrificed. The system may thus require a large signal to reverberation or background noise ratio for detection of zero doppler targets. This may result in short detection ranges for detection of zero doppler targets.

Figure 2:
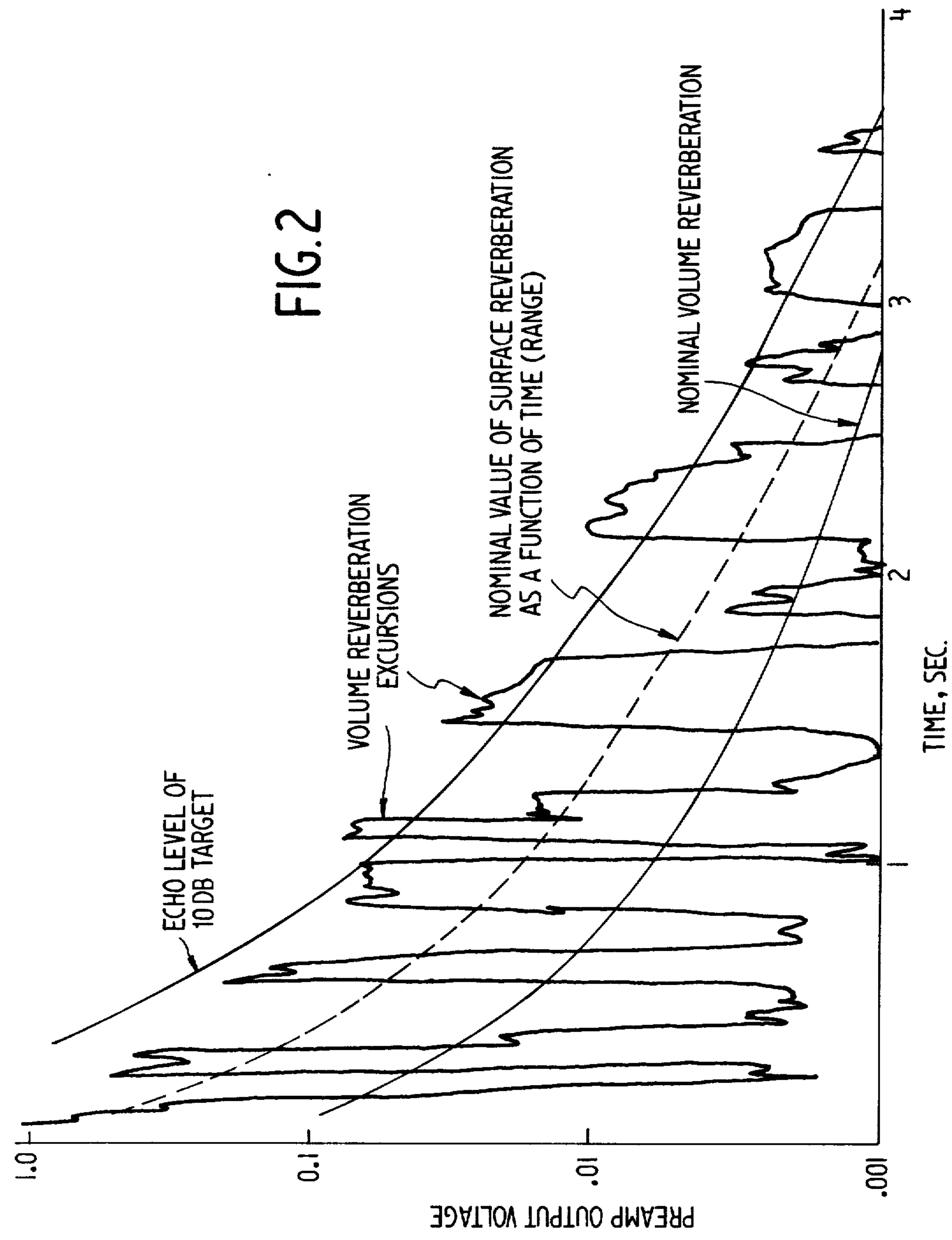
FIG. 2 is a graph illustrating the nature of reverberation conditions which may be encountered in underwater acoustic receiving systems; s

Improvements in target detection by an active acoustic homing system is complicated by the variations in underwater reverberation characteristics on a day-to-day and location-to-location basis. For example, FIG. 2 illustrates the nominal value and excursions about the nominal value of the instantaneous envelope of volume reverberation return plotted in terms of the output voltage from the preamplifier 16 of FIG. 1. The return or echo level from a 10 dB target is also plotted as a function of range in FIG. 2. Typically, this echo cannot be detected, except at very close ranges, due to interference from volume reverberation and, depending upon the depth and attitude at which the system is operating, the surface reverberation. Volume reverberation varies, of course, from location-to-location in a body of water and also varies as a function of time due to factors such as water temperature or presence of biological life or other suspended matter. In an ideal system, the effect of such variations upon target detectability would desirably be minimized.

In accordance with one aspect of the present invention, the ideal system response is more nearly approximated by controlling the gain of the voltage controlled variable gain amplifier 18 in a time varying manner based at least partially upon the expected average rate of fall off of reverberation as a function of time. In one embodiment of the invention, the automatic gain control loop gain is high during an initial portion of the period between successive transmitted pulses or pings, e.g., during the period in which the reverberation level is changing most rapidly, and the AGC loop gain is thereafter decreased considerably so that the AGC loop time constant is long compared to the pulse width of an expected target echo. Since the desired loop time constant is extremely long (e.g., greater than three times the target echo duration) during this latter portion of the interpulse period, the loop is so slow that it cannot normalize the expected reverberation fall off. Thus, in addition to providing a fast AGC loop time constant initially as was previously mentioned, a loop control voltage based upon the expected rate of fall off of the reverberation is utilized to augment the AGC loop during the latter portion of the interpulse period.

In accordance with another aspect of the invention, the target threshold applied to the comparator or target detector of the threshold circuit 22 is adapted to prevailing reverberation conditions. The adaptive threshold permits automatic variations of the target threshold level as a function of reverberation conditions so that target detectability is not sacrificed because of a need to meet worst case reverberation conditions.

Figure 3:
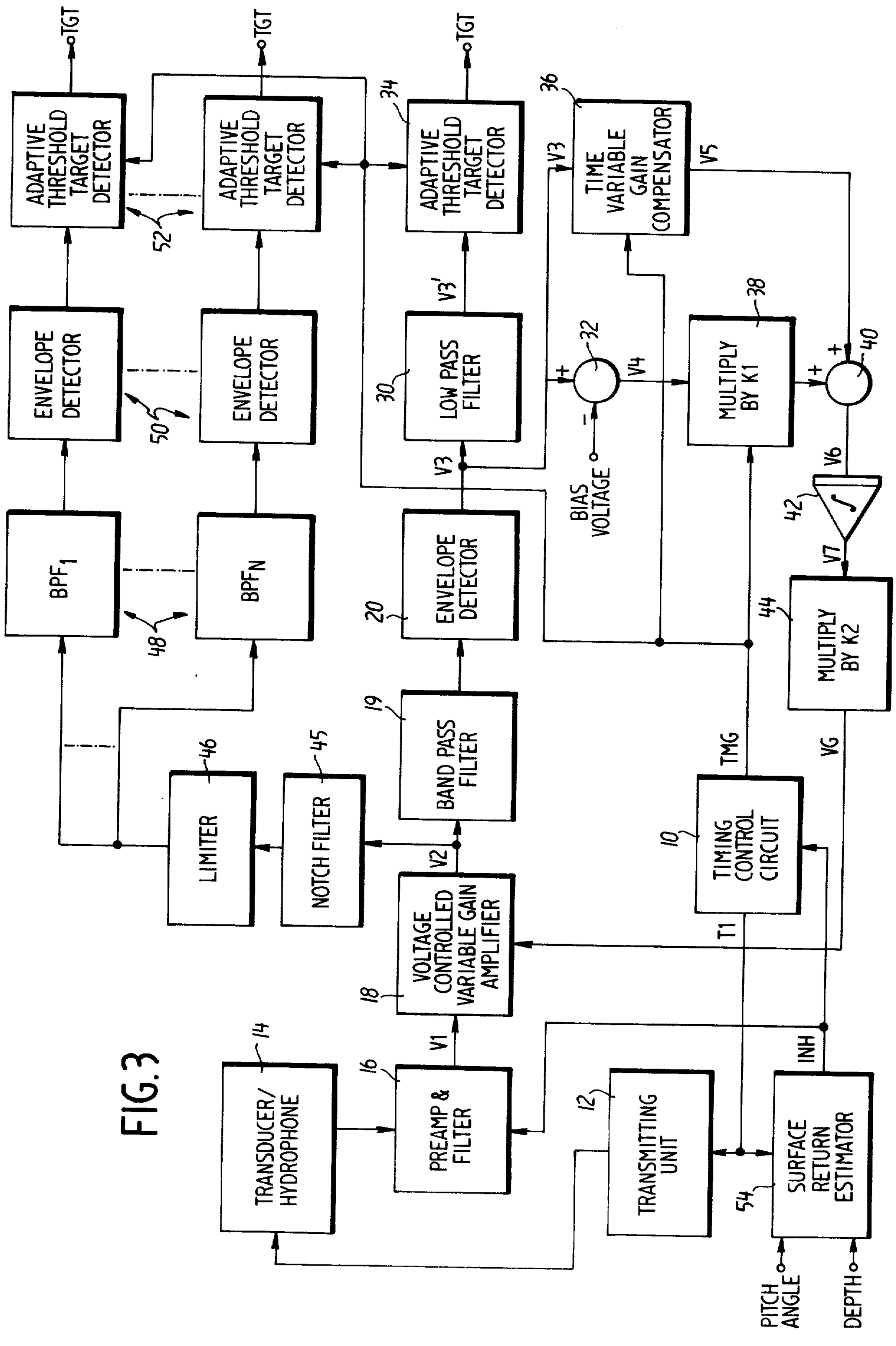
FIG. 3 is a functional block diagram of an underwater acoustic receiving system in accordance with a preferred embodiment of the present invention.

One embodiment of the present invention for providing the above described desirable gain control and threshold characteristics is illustrated functionally in FIG. 3.

Referring now to FIG. 3, wherein like numerical designations have been utilized to indicate functional blocks previously described in connection with FIG. 1, the signal received by the transducer/hydrophone 14 is amplified and filtered by the preamplifier filter 16 to provide the signal V1 which may be selectively amplified by the voltage controlled variable gain amplifier 18. For detection of low and zero doppler signals, the signal V2 from the variable gain amplifier 18 may be applied through a bandpass filter 19 to the envelope detector 20 for detection of the envelope of low doppler signals and the envelope may be filtered by a suitable low pass filter 30 to provide a signal V3'.

The detected and filtered envelope signal V3' may be applied to the plus or positive input terminal of a conventional subtractor 32 to an adaptive threshold target detector 34, and to a time variable gain compensator 36. The output signal V4 from the subtractor 32 may be multiplied by a gain $K_1$ by a suitable circuit 38 and applied, together with the output signal from the gain compensator 36, to a suitable adder 40. The output signal V6 from the adder 40 may be integrated by a suitable integrator 42 and the output signal V7 from the integrator 42 may be multiplied by a gain $K_2$ by a suitable circuit 44 to provide a gain control voltage VG for application to the voltage controlled, variable gain amplifier 18. In the preferred embodiment, both $K_1$ and $K_2$ are non-linear gains and vary as a function of input signal amplitude, for example, in a non-linear manner defined by the equation $GAIN=K \ln (1 - V4)$. This improves the loop operation considerably, allowing the loop to recover from large input amplitude spikes that tend to drive the loop gain way down.

For detection of higher doppler signals, the signal V2 from the variable gain amplifier 18 may be filtered by a suitable notch filter 45, limited by a suitable limiter 46 and applied to a bank of bandpass filters BPF1 through BPFn generally indicated at 48. An envelope detector 50 associated with each bandpass filter 48 may detect the envelope of the signal passed by each filter and the envelope signal may be applied to an associated adaptive threshold target detector 52.

As was previously described in connection with FIG. 1, the timing signal T1 may be applied to the transmitting unit 12 to control transmission of "pings." The timing signal T1 may also be applied to a surface return estimator 54 and attitude signals such as pitch angle and depth may be applied to the surface return estimator so that the time at which surface return or reverberation is expected may be calculated.

An inhibit signal 1NH from the surface return estimator may be applied to the preamp and filter 16 to inhibit receipt of surface reverberation and may also be supplied to the timing control circuit 10. The timing control circuit 10 may supply timing signals TMG to the multiplier circuit 38, the gain compensator 36 and to the adaptive threshold target detectors 34 and 52.

In operation, the timing control circuit 10 may periodically pulse the transmitting unit 12 to transmit a pulse or ping of sound wave energy via the transducer/-hydrophone 14. The surface return estimator 54 may simultaneously be triggered so that the estimated time of return of surface reverberation may be calculated.

Reflected sound or reverberation may be detected by the transducer/hydrophone 14 and amplified and filtered by the preamplifier and filter 16. The inhibit signal 1NH from the surface return estimator 54 may inhibit the preamplifier and filter circuit 16 for a period of time during which surface return or reverberation is received by the transducer/hydrophone 14. Alternatively, gating circuits in the time variable gain compensator 36 and the adaptive threshold target detectors 34 and 52 may be inhibited during this time period through application of the INH signal to the timing control circuit 10 if desired.

The output signal V1 from the preamplifier and filter 16 may be selectively amplified by the voltage controlled, variable gain amplifier 18 to produce the gain controlled signal V2. For low doppler signals returned from zero or low relative velocity targets, the signal V2 may be bandpass filtered by the filter 19, detected by the envelope detector 20 and passed by the low pass filter 30. Assuming appropriate correction for platform motion (not shown) the reverberation envelope signal V3' from the low pass filter 30 may therefore comprise return energy in a narrow frequency band centered about the frequency at which the sound wave energy or ping is transmitted by the transducer/hydrophone 14.

Of course, signals received from high doppler targets will be blocked by the bandpass filter 19 so that the signal V3 represents essentially zero doppler targets and thus includes volume reverberation. The low pass filter 30 provides some post detection integration prior to application of the signal to the adaptive threshold target detector 34 for detection of low doppler targets essentially through a comparison of the amplitude of the envelope signal V3 with a threshold level which is automatically adapted to prevailing reverberation conditions as will hereinafter be described in greater detail. A signal indicative of detected targets may be provided at the output terminal of the adaptive threshold target detector 35 as is indicated by the designation TGT.

During a ping period, i.e., the period between consecutive pings or transmitted pulses, the gain of the voltage controlled variable gain amplifier 18 is controlled by the control voltage VG in a time varying manner. During the initial portion of the ping period, a signal from the timing control circuit 10 sets the constant K1 in the multiplying circuit 38 at a relatively high level thereby establishing the time constant of the automatic gain control (AGC) loop at a high level during the initial portion of the ping period in which the reverberation level is changing most rapidly. After this initial portion of the ping period, e.g., after several milliseconds, the time constant of the automatic gain control loop is decreased considerably by decreasing the gain K1 of the multiplying circuit 38 so that the gain preferably varies non-linearly as was previously described.

At the same time, the time variable gain compensator 36 calculates the rate of reverberation fall off for the current ping period and simultaneously applies a correction signal to the adder 40. The correction signal represents the expected average rate or reverberation fall off during the subsequent ping period based upon the average rate of fall off of reverberation during the current and previous ping periods. The signal V6 from the adder 40 thus includes some selected portion of the signal V3 (a portion insufficient to normalize the expected reverberation fall off) compensated by the signal V5 which is an estimate of the expected average rate of reverberation fall off.

The composite rate signal V6 is integrated by the integrator 42 and the gain control signal VG may be produced by the circuit 44 in response to the integrator output signal V7 in accordance with the following equation:

$$VG = 10^{\frac{-V7}{2}} \qquad (1)$$

The compensation signal V5 applied from the time variable gain compensator 36 to the adder 40 of FIG. 3 is related to the average rate of reverberation fall off. Assuming that the gain of the amplifier 18 can be represented directly by the control voltage VG, the signal V5 required from the time variable gain compensator 36 to properly compensate the AGC loop may be calculated as follows:

$$(V1)\,(VG) = V3 \qquad (2)$$

$$V1 = \frac{V3}{VG} \qquad (3)$$

where $VG$ represents the actual gain of the amplifier 18 for the current ping period.

Under ideal conditions, the AGC loop will maintain the signal V3 at a constant level equal to the bias level B applied to the subtractor 32. The desired gain of the amplifier 18 (VG') may thus be represented as follows:

$$(VG')\,(V1) = B = V3 \qquad (4)$$

$$VG' = \frac{B}{V1} = \frac{(B)\,(VG)}{V3} \qquad (5)$$

The output voltage V7' required from the integration 42 to obtain the desired gain VG' may be calculated in terms of desired gain VG' and actual gain VG as follows:

$$VG' = 10^{\frac{-V7}{2}} \qquad (6)$$

$$\log VG' = \frac{-V7'}{2} \qquad (7)$$

-Continued $$V7' = -2 \log VG' = -2 \log \frac{(B)(VG)}{V3} \quad (8)$$

$$V7' = -2 \text{ Log } \frac{B}{V3} - 2 \text{ Log } VG \quad (9)$$

From equations (8) and (9) it can be seen that:

$$V7 = -2 \log VG \quad (10)$$

$$V7' = -2 \log \frac{B}{V3} + V7 \quad (11)$$

$$(V7' - V7) = E = -2 \log \frac{B}{V3} \quad (12)$$

$$E = -2(.4343)\ ln\ \frac{B}{V3} = .8686\ ln\ \frac{B}{V3} \quad (13)$$

The error component E of equation (13) defines the component which must be added to the integrator 42 output signal to correct the AGC loop. At the input to the integrator 42, the derivative of the error component E must be supplied. Thus, the correction signal V5 must be equal to the derivative of the error component E and may be expressed in terms of the envelope signal V3 as follows:

$$V5 = \frac{dE}{dt} = \frac{-.8686}{V3} \frac{(d\ V3)}{(dt)} \quad (14)$$

The gain controlled reverberation signal V2 is passed through the notch filter 45 to eliminate reverberation and limited by the limiter 46 and applied to each of the bandpass filters 48 (BPF1 – BPF*n*). Each of the bandpass filters 48 is tuned to pass a different portion of the overall frequency spectrum of the return signal except for the portion centered about the frequency of the transmitted signal and representing low or zero doppler targets. For example, the bandpass filter BPF1 may be tuned to pass a narrow band of frequencies at the low end of the frequency spectrum of possible return signals. The bandpass filter BPFn may be tuned to pass a narrow band of frequencies at the high end of this frequency spectrum. The intermediate bandpass filters BPF2 – BPF*n*–1 (not shown) may be tuned to pass adjacent narrow bands of the frequency spectrum intermediate the lower and higher ends of the spectrum. Thus, each bandpass filter 48 may define a channel through which targets of predetermined velocities may be detected.

For example, assuming that a target is moving away from the transducer/hydrophone 14, the received signal will have a downward doppler frequency shift, i.e., the frequency of the received signal will be less than the frequency of the signal transmitted by the transducer/hydrophone 14. Assuming that the maximum expected relative movement between the target and the transducer/hydrophone 14 exists and the received signal thus falls within the narrow band of frequencies to which the bandpass filter BPF1 and applied to its associated envelope detector 50. The detected envelope signal may then be applied to the adaptive threshold target detector 52 associated with the channel defined by the bandpass filter BPF1 for detection of the high doppler target.

One embodiment of the time variable gain compensator 36 of FIG. 3 is illustrated functionally in FIG. 4 to facilitate an understanding of the invention. Referring now to FIG. 4, the signal V3 from the envelope detector 20 of FIG. 3 may be applied to the time variable gain compensator 36 together with the timing signal TMG from the timing control circuit 10. The signal V3 may be gated through a suitable conventional gate or electronically controlled switch 60 as the gated video signal VX for application to a time variable gain (TVG) rate estimator 62. The output signal V8 from TVG rate estimator may be applied to a suitable conventional plural stage sample and hold circuit 64 which may supply the stored compensating signal V5 both to the adder 40 of FIG. 3 and to the TVG rate estimator 62.

The timing signal TMG from the timing control circuit 10 may include several synchronized timing signals. A first timing signal TMG1 may control the operation of the gate 60 and a second timing signal TMG2 may control the operation of the sample and hold circuit 64. The timing signal TMG2 may also be delayed through a suitable conventional delay circuit 66 and the delayed timing signal TMG2 may be applied to the TVG rate estimator 62 to reset the estimator 62 after each sampling period.

Figure 4A:
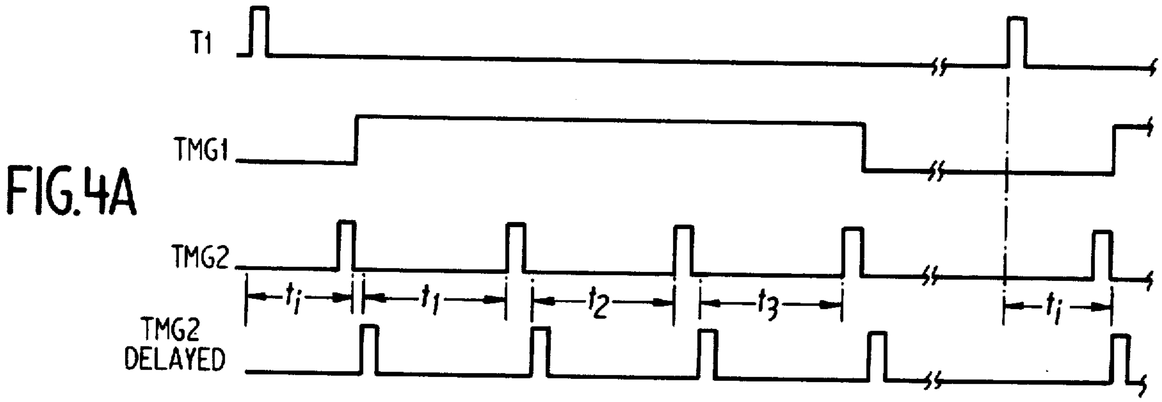
FIGS. 4A and 4B are graphic illustrations of the timing of the time variable gain compensator of FIG. 4.

The operation of the time variable gain compensator 36 of FIG. 4 may be more clearly understood with reference to FIG. 4A wherein there is illustrated an exemplary timing diagram referenced to the timing signal T1 which controls the transmission of the pulses or pings of sound wave energy. Referring now to FIGS. 4 and 4A, the timing signal TMG1 may enable the gate 60 a predetermined initial time ti after transmission of a ping e.g., 0.25 seconds thereafter. As was previously discussed, the AGC loop gain is high prior to enabling the gate 60 so as to permit rapid AGC loop response during the period in which reverberation level is changing most rapidly. During this initial period, the time variable gain compensator 36 is inoperative but is thereafter enabled by the TMG1 timing signal to gate the signal V3 to the TVG rate estimator 62 as the gated video-signal VX.

The TVG rate estimator 62 is reset by the delayed TMG2 signal from the delay circuit 66 at approximately the same time the gate 60 is enabled. Thereafter, the TVG rate estimator 62 estimates the rate of fall off of the reverberation in response to the video signal V3' and the previously estimated TVG rate supplied from the sample and hold circuit 64. After a predetermined period of time t1, the timing signal TMG2 triggers the sample and hold circuit 64 so that the estimated rate represented by the signal V8 is sampled and stored. The TVG rate estimator 62 is reset shortly thereafter by the delayed TMG2 signal and the reverberation fall off rate during a subsequent time period is estimated by the rate estimator 62. This subsequently estimated rate of reverberation fall off represented by the signal V8 may be sampled and stored by the sample and hold circuit 64 in response to the timing signal TMG2 at the end of a time period *t*2 and the TVG rate estimator 62 may again be reset to a desired initial condition for subsequent estimation of reverberation fall off rate.

This periodic estimation of reverberation fall off rate in the sampling and storing thereof may continue for several time periods as desired. For example, the reverberation fall off rate may be estimated and sampled and stored several times during the period in which volume reverberation exhibits considerable amplitude variations, i.e., from the end of the initial time period ti until the nominal volume reverberation is substantially constant (see FIG. 2). It is likely, however, that two or three samples during this period of interest will suffice.

Figure 4B:
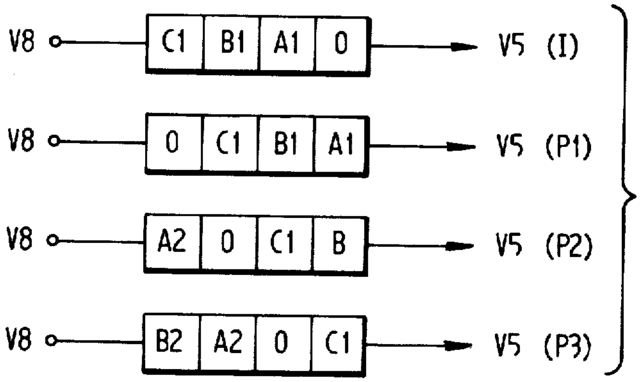

It can be seen from the above that several samples of estimated reverberation fall off rate may be provided by the time variable gain compensator 36 of FIG. 4 through the use of a plural state, serially shiftable sample and hold circuit 64. The rate estimates for a current ping period may be stored while the estimates for the immediately preceding ping period may be applied to the adder 40 of FIG. 3 (and the TVG rate estimator 62). This may be more clearly understood with reference now to FIG. 4B wherein a four stage sample and hold circuit is schematically illustrated at certain times during a ping cycle in which three estimated reverberation fall off rates designated A, B and C are sampled and stored.

Referring now to FIG. 4B, the stages of the sample and hold circuit may initially contain (at the beginning of a ping period) a zero or no signal, the first sampled rate estimate A1 from the previous ping period, the second sampled rate estimate B1 from the previous ping period. The initial pulse P1 of the timing signal TMG2 may shift the V8 signal into the first stage of the sample and hold circuit and shift the previously stored signals A, B1 and C1 one stage to the right so that the stored rate signal A1 is available as the V5 signal. During the period of time between the first and second TMG2 pulses P1 and P2 the current reverberation fall off rate may be estimated and when the pulse P2 occurs, the estimated rate signal A2 may be stored in the first stage of the sample and hold circuit simultaneously with the shifting of the other signals one stage to the right. The B1 signal is thus available between the second and third pulses P2 and P3 as the compensation signal V5.

The third and fourth timing pulses P3 and P4 of the TMG2 signal may similarly shift new reverberation rate estimates into the sample and hold circuit while making available the appropriate rate estimate from the previous ping period as the loop compensation signal. After the fourth pulse P4 of the TMG2 signal occurs, the sample and hold circuit is in the initial state designated (I) with updated rate values stored therein.

One embodiment of the TVG rate estimator 62 of FIG. 4 is illustrated in greater detail in the functional block diagram of FIG. 5 to facilitate an understanding of the invention. Referring now to FIG. 5, the gated video signal VX may be applied to a conventional slope calculator 68 and a signal VS representative of the calculated rate of reverberation fall off (the average slope or derivative of the signal VX) may be supplied from the slope calculator 68 to multiplier 70. The multiplier 70 may multiply the signal VS by a constant K3 and the resultant product may be applied to a suitable conventional adder 72. The signal V5 stored by the sample and hold circuit 64 of FIG. 4 during the previous ping period may be multiplied by the constant (1 − K3) by a suitable multiplier 73 and the product may be applied to the adder 72. The adder 72 may sum the two input signals and supply the output signal V8 for application to the sample and hold circuit 64 of FIG. 4 as was previously described.

In operation, the slope calculator 68 may operate to solve equation (14) described in connection with FIG. 3. The average slope or derivative VS of the reverberation signal VX over the time period of interest may be calculated by the slope calculator 68 in any suitable conventional manner. For example, a summing technique operable in accordance with the following equation may be employed to calculate the approximate slope or derivative:

$$\frac{dVX}{dt} = \frac{\left[\frac{1}{n}\sum_{1}^{n} VX_i \sum_{1}^{n} ti - \sum_{1}^{n} VX_i\, ti\right]}{\left[\frac{1}{n}\left\{\sum_{1}^{n} ti\right\}^2 - \sum_{1}^{n} ti^2\right]} \qquad (15)$$

The reciprocal of the average amplitude of the gated envelope signal VX may be calculated in a conventional manner by a summing technique operable in accordance with the following equation:

$$\frac{.8686}{VX} = \frac{.8686}{\frac{1}{n}\sum_{1}^{n} VX_i} \qquad (16)$$

The signals generated in accordance with equations (15) and (16) above may be combined to provide an approximation of the average slope of the reverberation fall off over the period of time determined by the timing signal TMG2 as was previously described in connection with FIGS. 3, 4, 4A, 4B and equation (14). The signal VS is thus proportional to the average current rate of reverberation fall off and may be multiplied by a fractional constant K3 so that the product of K3 and VS may be added to (1 − K3) times the previous estimate of reverberation fall off rate (the stored signal V5) to produce an average reverberation fall off rate over successive ping periods.

One embodiment of the adaptive threshold target detectors 34 and 52 according to the present invention is illustrated in FIG. 6. Referring now to FIG. 6, a detected envelope signal, e.g., the signal V3′ from the low pass filter 30, may be applied both to a suitable conventional threshold circuit 74 and to a conventional electronic gate 76. The output signal from the gate 76 may be applied to a variance estimator 78 and the output signal from the variance estimator may be sampled and stored by a suitable sample and hold circuit 80.

The output signal from the sample and hold circuit 80 may be applied as a threshold level to the threshold circuit 74 and the output signal from the threshold circuit 74 may be provided to further receiver circuits. The timing of the enabling and inhibiting of the gate 76, the resetting of the variance estimator 78 and the sampling and storing of the sample and hold circuit 80 may be controlled by the TMG signals from the timing control circuit 10 of FIG. 3 in a manner similar to that described in connection with FIGS. 3, 4, 4A and 4B or in any other suitable manner.

In operation, the detected envelope of the received or return acoustic wave energy may be applied to the threshold circuit 74 for detection of any signals above the threshold level applied to the threshold circuit 74 as sonar targets. The detected envelope includes the envelope of the normalized reverberation and may also be applied to the gate 76 for generation of the threshold signal applied to the threshold circuit.

The gate 76 selectively applies a sample of the detected envelope to the variance estimator 78 at appropriate times during each ping period or interval, i.e., during each interval between successive pings. In accordance with the preferred embodiment of the invention, the variance estimator squares the envelope of the normalized reverberation and averages this value. A suitable conventional circuit such as a resettable square law filtering circuit may be employed for this purpose.

The squaring and averaging of the normalized reverberation envelope by the variance estimator 78 provides an output signal which represents an estimate of the second moment of the envelope signal. This output signal from the variance estimator 78 may be sampled, and stored by the sample and hold circuit 80 and may be employed, in conjunction with a fixed threshold level or a fixed offset provided by the threshold circuit 74, as the target threshold level. Thus, in order to detect a signal as a target, the signal must exceed the second moment or some multiple of the second moment of the envelope signal calculated during a previous ping period plus a fixed threshold.

The use of the envelope related threshold level insures that the target threshold adapts to the prevailing reverberation conditions. The fixed threshold provides a means by which the false detection of any signals above the threshold level applied to the threshold circuit 74 as sonar targets. The detected envelope includes the envelope of the normalized reverberation and may also be applied to the gate 76 for generation of the threshold signal applied to the threshold circuit.

The gate 76 selectively applies a sample of the detected envelope to the variance estimator 78 at appropriate times during each ping period or interval, i.e., during each interval between successive pings. In accordance with the preferred embodiment of the invention, the variance estimator squares the envelope of the normalized reverberation and averages this value. This may be done digitally with a suitable multiplier and summing circuit.

The squaring and averaging of the normalized reverberation envelope by the variance estimator 78 provides an output signal which represents an estimate of the second moment of the envelope signal. This output signal from the variance estimator 78 may be sampled, and stored by the sample and hold circuit 80 and may be employed, in conjunction with a fixed threshold level or a fixed offset provided by the threshold circuit 74, as the target threshold level. Thus, in order to detect a signal as a target, the signal must exceed the second moment or some multiple of the second moment of the envelope signal calculated during a previous ping period plus a fixed threshold.

The use of the envelope related threshold level insures that the target threshold adapts to the prevailing reverberation conditions. The fixed threshold provides a means by which the false alarm or false target detection rate may be adjusted to a suitable value. The target detector of the present invention is thus automatically adaptive to a selected false alarm rate for prevailing reverberation conditions so that maximum target detection is achieved under varying reverberation conditions.

Moreover, the adaptive target detector according to the invention protects against range gate capture by a pulsed jammer by desensitizing the detection in the presence of this type of jamming. In most instances, this adaptive threshold technique will permit a torpedo to continue its search for targets in the presence of such countermeasures. Hence, the torpedo will have a greater chance of detecting a true target than if the range gate of the receiving circuit were captured.

The expected performance of the adaptive threshold target detection system has been estimated. Under worst case reverberation conditions, a signal-to-noise ratio of +15 dB will typically be required for detection. The system of the invention offers an improvement over performance of existing torpedo homing systems employing a reverberation rejection notch filter because of the reverberation adaptive threshold. For example, since the spectral width of the target return is less than the spectral width of the reverberation, the zero doppler target echo receives more attenuation than the reverberation resulting in a net loss in signal-to-noise ratio. A signal-to-noise ratio of 15 dB corresponds to a detection range of approximately 1,600 yards for a typical torpedo acoustic system. If now the character of the reverberation is such that the variance of the normalized envelope is decreased by a factor of 2, then the detection threshold will be lowered in accordance with the invention commensurate with this factor and a signal-to-noise ratio of 8.5 dB will be required for detection while the probability of false alarm is maintained constant. This detection threshold corresponds to a detection range of 3,200 yards for a typical torpedo sonar system.

The embodiment illustrated in FIG. 6 includes control logic to estimate the variance of the reverberation during various time intervals within each ping period and make adjustments to the threshold to be applied within the course of a subsequent ping period. The interval chosen may be long compared to a pulse length but short enough to estimate the changes due to boundary reverberation. Such timing provides protection against surface and bottom false alarms.

The presence of surface reverberation may result in severe restrictions on the detection threshold. Consequently, an alternate method for eliminating the effect of surface reverberation may be used. This alternate technique may be to estimate the expected time of return of the surface reflection and ignore "detections" that coincide with this time $\pm X$ msec. The expected time of return may be estimated in any suitable manner from measurements of depth and attitude.

What is claimed is:

1. Apparatus for controlling the gain of a sonar receiving circuit during ping periods between transmitted pulses of acoustic energy to minimize the effects of changing reverberation conditions comprising:

means for detecting the envelope of return acoustic energy during each ping period;

means for storing a first signal representative of the amplitude of the detected envelope at a first predetermined time during a first ping period and for storing a second signal representative of the amplitude of the detected envelope at a second predetermined time during the first ping period subsequent to the first time, the first and second stored signals representing an expected reverberation condition for ping periods subsequent to the first ping period; and, means for controlling the gain of the sonar receiving circuit during a second ping period subsequent to the first ping period in response both to the amplitude of the detected envelope in the second ping period and to the first and second stored signals.

2. The apparatus of claim 1 wherein said gain controlling means comprises:

means for generating a gain control signal related to an expected rate of reverberation fall off as a function of time in response both to the amplitude of the detected envelope in the second ping period and to the first and second stored signal; and, a voltage controlled variable gain amplifier for anplifying detected return acoustic energy by an amount related to the amplitude of said gain control signal.

3. The apparatus of claim 2 wherein said gain control signal generating means comprises:

means for generating a first gain control signal or sufficient amplitude to normalize the reverberation during an initial portion of each ping period and of insufficient amplitude to normalize the reverberation during a remaining portion of each ping period; and, means for modifying said first gain control signal during said remaining portion of each ping period by an amount related to said first and second stored signals.

4. The system of claim 1 wherein received signals above a threshold level are detected as sonar targets, the system including:

means for generating a control signal representing the second moment of the received reverberation signal; and, means for generating said threshold level in response to said control signal.

5. The system of claim 3 wherein received signals above a threshold level are detected as sonar targets, the system including:

means for generating a control signal representing the second moment of the received reverberation signal; and, means for generating said threshold level in response to said control signal.

6. Apparatus for controlling the gain of a sonar receiving circuit to minimize adverse effects of changing reverberation conditions comprising:

a voltage controlled variable gain amplifier controlled by a gain control feedback loop;

means for applying detected acoustic signals to said voltage controlled variable gain amplifier for variable amplification thereof;

means for controlling the gain of the gain control feedback loop of said amplifier such that the gain is sufficient to normalize reverberation during an initial portion of each ping period and is insufficient to normalize reverberation during a remaining portion of each ping period;

means for sampling reverberation received during each ping period; and, means for modifying the gain of the gain control loop during said remaining portion of each ping period by an amount related to the average rate of fall off of reverberation as a function of time in response to the reverberation sampled during at least two previous ping periods.

7. A system for detecting sonar targets in the presence of varying received reverberation signals comprising:

means for detecting and normalizing the received reverberation signals;

means for generating a threshold signal related to the second moment of the normalized reverberation signal; and, means for detecting, as sonar targets, received signals having an amplitude exceeding said threshold signal.

8. A method for controlling the gain of a sonar receiving circuit to minimize the effects of changing reverberation conditions comprising the steps of:

detecting the envelope of return energy during a first ping period;

storing a first signal representative of the amplitude of the detected envelope at a first time during the first ping period;

storing a second signal representative of the amplitude of the detected envelope at a second time during the first ping period, the first and second stored signals representing an expected reverberation condition for ping periods subsequent to the first ping period;

detecting the envelope of return energy during a second ping period subsequent to the first ping period; and, controlling the gain of the receiving circuit in response to the amplitude of the detected envelope in the second ping period and to the first and second stored signals.

9. A method for detecting sonar targets in the presence of undesired, varying reverberation levels comprising the steps of:

sampling received reverberation during a first ping period and storing a signal representative of the amplitude of the sampled reverberation;

controlling the level of received reverberation at least partially in response to said stored signal during a second ping period subsequent to the first ping period;

generating a control signal representing the second moment of the received reverberation signal;

generating a threshold level in response to said control signal; and, detecting received signals above the said threshold level as sonar targets.

10. A method of controlling the gain of a sonar receiving circuit to minimize adverse effects of changing reverberation conditions comprising the steps of:

applying received signals to a voltage controlled variable gain amplifier controlled by a gain control feedback loop;

controlled the gain of the gain control loop such that the gain is sufficient to normalize reverberation during an initial portion of each ping period and is insufficient to normalize reverberation during a remaining portion of each ping period;

sampling reverberation received during each ping period; and, modifying the gain of the gain control loop during said remaining portion of each ping period by an amount related to the average rate of fall off of reverberation as a function of time in response to the reverberation sampled during a previous ping period.

11. A system for detecting sonar targets in the presence of varying received reverberation levels comprising:

means for sampling received reverberation during a first ping period and storing a signal representative of the amplitude of the sampled reverberation;

means for controlling the level of received reverberation at least partially in response to said stored signal during a second ping period subsequent to the first ping period;

means for generating a control signal representing the second moment of the received reverberation signal;

means for generating a threshold level in reponse to said control signal; and, means for detecting received signals above the controlled level of the received reverberation and said threshold level as sonar targets.

* * * * *